March 3, 1964

I. H. GERKS 3,123,772

SYSTEM FOR MEASURING REFRACTIVE INDEX OF IONOSPHERE

Filed Jan. 27, 1961

INVENTOR.
IRVIN H. GERKS
BY
ATTORNEY

United States Patent Office 3,123,772
Patented Mar. 3, 1964

3,123,772
SYSTEM FOR MEASURING REFRACTIVE INDEX OF IONOSPHERE
Irvin H. Gerks, Cedar Rapids, Iowa, assignor to Collins Radio Company, Cedar Rapids, Iowa, a corporation of Iowa
Filed Jan. 27, 1961, Ser. No. 85,321
4 Claims. (Cl. 325—67)

This invention relates in general to measuring means, and in particular to apparatus for measuring the refractive index of an ionized medium by use of Doppler frequency shift.

An article entitled "Some Deductions of Ionospheric Information From the Observations of Emissions From Satellite 1957α2" by G. J. Aitchison and K. Weekes appearing in the Journal of Atmospheric and Terrestrial Physics, volume 14, pages 236–248, June 1959, gave a mathematical analysis of two methods of measuring the integrated electron density of the earth's surroundings defined by the equation.

$$D = \frac{\partial}{\partial t} \int_0^h N \, dh$$

where "N" is the electron density and "h" is the height.

It is often desirable to measure the integrated electron density over a height interval $h$ rather than its time derivative, and it is the purpose of this invention to disclose a method of measuring the integrated electron density by utilizing Doppler shift of frequency.

Objects, features and advantages of this invention will become apparent from the following description and claims when read in view of the drawings in which:

Figure 1:
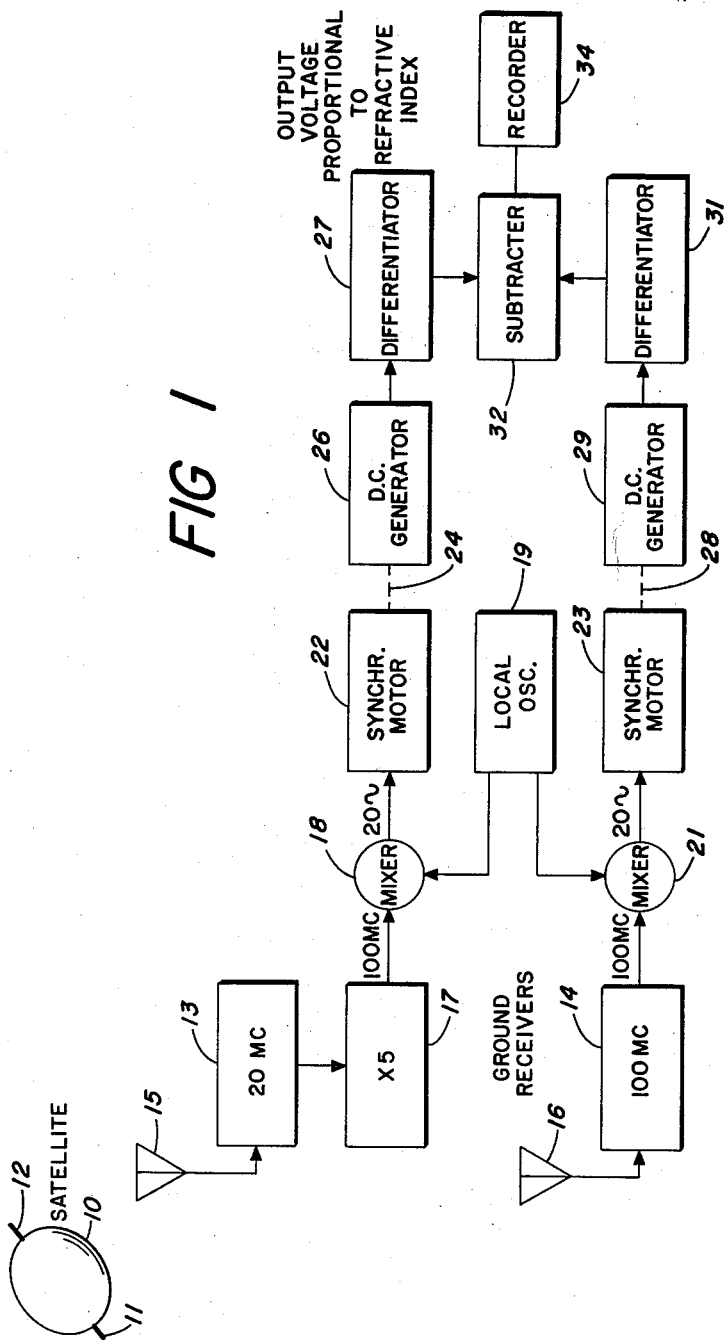
FIGURE 1 illustrates in block form the apparatus of this invention.

It is well known that, in a homogeneous medium, a wave is propagated with a phase factor exp. $j(\omega t - \beta r)$, where $\omega$ is the angular frequency of the transmitted wave, $\beta$ is the phase constant of the medium ($\beta = \omega/v$), and $r$ is the distance from the source. Thus, the phase angle at the receiver is $$\theta = \omega t - \beta r = \omega(t - r/v) = \omega(t - \mu r/c) \quad (1)$$

where $\mu$ is the refractive index and $c$ is the phase velocity in a vacuum. For a non-homogeneous medium, this must be written $$\phi = \omega t - \int_0^r \beta \, ds$$

$$= \omega t - \frac{\omega}{c} \int_0^r \mu \, ds \quad (2)$$

where $\mu$ is a function of $s$, the distance along the propagation path. The angular frequency perceived on the ground is $$\omega_r = d\phi/dt = \omega \left(1 - \frac{1}{c} \frac{\partial}{\partial t} \int_0^r \mu \, ds \right) \quad (3)$$

The Doppler shift is given by $$\Delta \omega = \omega_r - \omega = -\frac{\omega}{c} \frac{\partial}{\partial t} \int_0^r \mu \, ds \quad (4)$$

or $$\Delta f = -\frac{f}{c} \frac{\partial}{\partial t} \int_0^r \mu \, ds = -\frac{1}{\lambda_0} \frac{\partial}{\partial t} \int_0^r \mu \, ds \quad (5)$$

where $\lambda_0$ is the free-space wavelength. For the case of a homogeneous medium, this becomes simply $$\Delta f = -\frac{\mu f}{c} \frac{dr}{dt} = -\frac{\mu}{\lambda_0} \frac{dr}{dt} \quad (6)$$

It is apparent that, in a homogeneous medium, the refractive index is readily determined in terms of the Doppler shift and the radial component of velocity.

Figure 2:
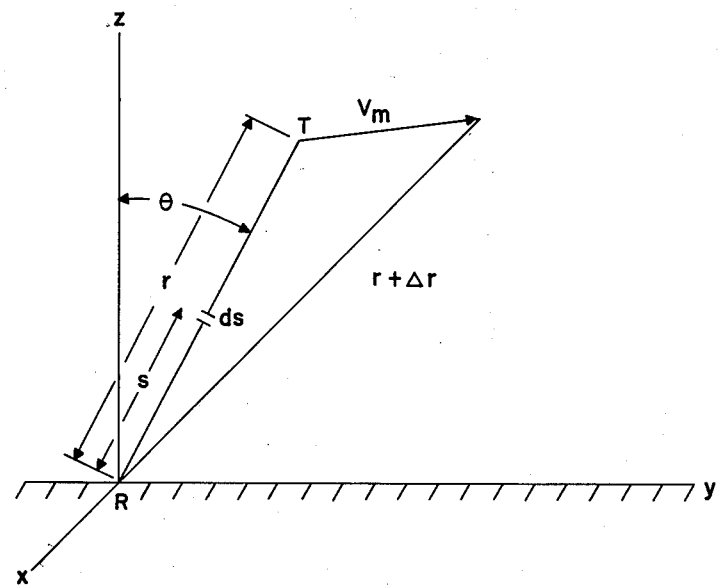
FIGURE 2 illustrates the angles involved in this problem.

In order to simplify the subsequent analysis, it will be assumed that the medium is horizontally stratified, that the source is located not too far from the observer's zenith, and that the frequency of operation is much greater than the plasma frequency. Under these conditions, the deviation of the ray in traversing the medium may be neglected, and the propagation path is essentially a straight line centered at the observer. This means that the propagation path from the transmitter T to the observer R in FIGURE 2 is essentially a straight line. Since the angle $\theta$ is to be restricted to relatively small values, it is permissible to assume plane-earth geometry. The transmitter moves with a constant velocity $v_m$ in a direction not necessarily in the $yz$ plane. The refractive index is assumed to be a function of $z$ only. Since the line RT may rotate about the point R, the refractive index is in general a function of both $s$ and $t$. Only in the case where $v_m$ is purely radial is $\mu$ a function of $s$ alone.

By employing the rule for differentiation under the integral sign (see I. S. and E. S. Sokolnikoff, Higher Mathematics for Engineers and Physicists, McGraw-Hill Book Company, Inc., New York and London, second edition, 1941; p. 167) we obtain $$\frac{\partial}{\partial t} \int_0^{r(t)} \mu(s, t) \, ds = \mu(r, t) \frac{dr}{dt} + \int_0^r \frac{\partial \mu}{\partial t} \, ds \quad (7)$$

When the motion of the transmitter T is purely radial, $\mu$ is not a function of $t$, and the second term in the right member of (7) disappears. Hence, in this case, the Doppler shift is again given by Equation 6, just as in a homogeneous medium. The only restriction is that the deviation of the ray along the path must be small. This shows that, with purely radial motion, such as may be obtained with a suitably launched rocket, the refractive index at every point along the path may be measured in terms of the Doppler shift if the velocity of the point T is known.

The radial velocity of the rocket may be easily determined and eliminated from the calculation if the transmitter T radiates simultaneously on two frequencies, $f$ and $nf$, where $n$ is a sufficiently large integer so that the medium has a refractive index of essentially unity at the frequency $nf$. The free-space wavelength at the higher frequency is $\lambda_0/n$, so that (6) yields $$\Delta(nf) = -\frac{n}{\lambda_0} \frac{dr}{dt} \quad (8)$$

When this is substituted in (6), we get $$\Delta f = \frac{\mu \Delta(nf)}{n}$$

or $$n\Delta f = \mu \Delta(nf) \quad (9)$$

Now let $\mu = 1 + \Delta \mu$. Solving for $\Delta \mu$, we get $$\Delta \mu = \frac{n\Delta f - \Delta(nf)}{\Delta(nf)} \quad (10)$$

In order to allow accurate measurement of the numerator in (10), it is desirable to multiply the lower frequency by $n$ at the receiver and then beat this signal with the higher-frequency signal in a mixer. The frequency of the mixer output then gives the numerator directly. The denominator can be determined in the usual manner by comparing the measured frequency at R with the known frequency at T.

If the higher frequency is not large enough to make the refractive index essentially equal to unity, but is still large enough to make the departure from unity small, Equation 10 may be written $$\mu_1 - \mu_2 = \frac{n\Delta f - \Delta(nf)}{\Delta(nf)} \quad (11)$$

As shown in the previously referenced Aitchison and Weekes article when the operating frequencies are high compared to the plasma frequency and the gyrofrequencies, when the absorption is small, and when the angle between the ray and the magnetic field is less than about 80°, the refractive index is closely approximated by the formula $$\mu^2 = 1 - \omega_0^2/\omega^2 \quad (12)$$

where $\omega_0$ is the angular plasma frequency, given in rationalized MKS units by $$\omega_0^2 = \frac{Ne^2}{\epsilon_0 m} \quad (13)$$

or approximately $$f_0 = 9\sqrt{N} \quad (14)$$

Here N is the electron density per m.³, $e$ is the electron charge in coulombs, $m$ is the electron mass in kilograms, and $\epsilon_0$ is the permittivity of free space $(10^{-9}/36\pi f/m)$. Equation 12 becomes $$\mu^2 = 1 - 81N/f^2 \quad (15)$$

If again we let $\mu = 1 + \Delta\mu$, we get $$\Delta\mu = \sqrt{1 - 81N/f^2} - 1 \approx -40.5N/f^2 \quad (16)$$

Combining this with (10) gives $$N \approx \frac{[\Delta(nf) - n(\Delta f)]f^2}{40.5\Delta(nf)} \quad (17)$$

As an example, illustrating approximately the minimum electron density which can be measured by this method, assume $f = 20$ mc., $n = 5$, $dr/dt = 10{,}000$ ft./sec., $n\Delta f - \Delta(nf) = 1$ c./sec. From (8), $\Delta(nf) = 1014$ c./sec. From (10), $\Delta\mu = -1/1014$. From (16), $$N = 9.72 \times 10^9 \text{ m.}^{-3}$$

(approximately $10^4$ cm.$^{-3}$). This may be compared with a daytime maximum in the F₂ layer of more than $10^{12}$ m.$^{-3}$. It should, of course, be possible to estimate beat frequencies considerably smaller than 1 c./sec. with fair accuracy, so that the method can probably be used for N as low as $10^9$ m.$^{-3}$. At night, when the maximum plasma frequency is reduced, lower operating frequencies may be chosen, and the method should be usable for measuring electron density as low as $10^8$ m.$^{-3}$.

In spite of the versatility of this method, it has the disadvantage that the firing of rockets, especially those capable of reaching altitudes above the F layer, is quite costly. This makes it desirable to investigate the feasibility of obtaining electron density measurements by the use of transmissions from satellites. A satellite has a large component of its velocity in the horizontal direction. Hence, it is in general no longer permissible to assume that $\partial\mu/\partial t$ in Equation 7 is negligibly small. There is, however, one condition for which $\partial\mu/\partial t$ is equal to zero. This occurs when the satellite has only horizontal motion and when it reaches the point at which T is nearest to R. At this point, the satellite is moving perpendicular to the line of sight, so that $dr/dt = 0$. The line TR is rotating about R so that every point on the line is moving parallel to the stratification, so that $\partial\mu/\partial t = 0$. Hence, both terms in the right member of (7) are zero, and, according to (5), the Doppler shift is zero. If the satellite has a vertical component of velocity, then zero Doppler shift does not necessarily occur at the point of closest approach. The two terms in the right member of (7) may have equal values with opposite signs, so that neither $dr/dt$ nor $\partial\mu/\partial t$ is zero when the Doppler shift is zero. Of course, this may occur also when the medium is inhomogeneous in the horizontal direction, even when the satellite motion is horizontal.

It will be assumed at this point that the orbit of the satellite has only a small eccentricity, so that its motion is nearly horizontal. Since we may write $$\partial\mu/\partial t = \frac{\partial\mu}{\partial z}\frac{dz}{dt}$$

and since the vertical component of velocity $dz/dt$ is very much smaller than the horizontal component, the error involved in assuming $\partial\mu/\partial t = 0$ at the point of closest approach is certainly quite small.

We must now consider how we may take advantage of this assumption. Since the Doppler shift is zero at closest approach, it is necessary to measure the rate of change of Doppler shift. By differentiating (7) with respect to $t$, we obtain $$\frac{\partial^2}{\partial t^2}\int_0^{r(t)} \mu(s,t)\,ds = \frac{\partial}{\partial t}\left[\mu(r,t)\frac{dr}{dt} + \int_0^{r(t)} \frac{\partial}{\partial t}\mu(s,t)\,ds\right]$$

$$= \frac{\partial}{\partial t}\mu(r,t)\frac{dr}{dt} + \mu(r,t)\frac{d^2r}{dt^2}$$

$$+ \frac{\partial}{\partial t}\mu(s,t)\bigg|_{s=r}\frac{dr}{dt} + \int_0^{r(t)} \frac{\partial^2}{\partial t^2}\mu(s,t)\,ds \quad (18)$$

Since we are assuming $dr/dt = 0$ at the point of measurement, this reduces to $$\frac{\partial^2}{\partial t^2}\int_0^{r(t)} \mu(s,t)\,ds = \mu(r,t)\frac{d^2r}{dt^2} + \int_0^{r(t)} \frac{\partial^2}{\partial t^2}\mu(s,t)\,ds \quad (19)$$

To evaluate the second derivative of $\mu$ with respect to $t$, we write $$\frac{\partial\mu}{\partial t} = \frac{\partial\mu}{\partial z}\frac{ds}{dt} \quad (20)$$

$$\frac{\partial^2\mu}{\partial t^2} = \frac{\partial\mu}{\partial t\partial z}\frac{dz}{dt} + \frac{\partial\mu}{\partial z}\frac{d^2z}{dt^2} \quad (21)$$

Since a measurement is to be made only at the time when every point on the line TR is moving horizontally, $dz/dt = 0$, and (19) becomes $$\frac{\partial^2}{\partial t^2}\int_0^{r(t)} \mu(s,t)\,ds\bigg|_{r=r_0} = \mu(r_0)\frac{d^2r}{dt^2} + \int_0^{r_0} \frac{\partial\mu}{\partial z}\frac{d^2z}{dt^2}\,ds \quad (22)$$

where $r_0$ is the minimum value of $r$. It is now necessary to evaluate $d^2r/dt^2$ and $d^2z/dt^2$.

Assume that the satellite is moving parallel to the $x$-axis. Let $x_m$ be $x$-coordinate of the satellite. Then $$r = (r_0^2 + x_m^2)^{1/2}$$

$$\frac{dr}{dt} = x_m V_m (r_0^2 + x_m^2)^{-1/2}$$

$$\frac{d^2r}{dt^2} = [(r_0^2 + x_m^2)^{-1/2} - x_m^2(r_0^2 + x_m^2)^{-3/2}]V_m^2 \quad (23)$$

At the point of closest approach, where $x_m = 0$, this becomes $$\frac{d^2r}{dt^2} = V_m^2/r_0 \quad (24)$$

Now assume some point P $(x, y, z)$ on the line TR, such that $$s = (x^2 + y^2 + z^2)^{1/2}$$

Assume coordinates $x_m$, $y_m$, $h$ for the point T. The directional cosines of the line TR are given by $$\cos \alpha = x/s = x_m/r$$
$$\cos \beta = y/s = y_m/r$$
$$\cos \gamma = z/s = h/r$$

Since $\cos^2 \alpha + \cos^2 \beta + \cos^2 \gamma = 1$, we have $$\frac{x_m^2}{r^2} + \frac{y_m^2}{r^2} + \frac{z^2}{s^2} = 1,$$

$$\frac{z^2}{s^2} = 1 - \frac{x_m^2 + y_m^2}{x_m^2 + y_m^2 + h^2} = \frac{h^2}{x_m^2 + r_0^2},$$

$$z = sh(x_m^2 + r_0^2)^{-1/2} \quad (25)$$

Differentiation with respect to $t$ yields $$\frac{ds}{dt} = -shx_m V_m (x_m^2 + r_0^2)^{-3/2}$$

$$\frac{d^2z}{dt^2} = -shV_m^2(x_m^2 + r_0^2)^{-3/2} + 3shx_m^2 V_m^2 (x_m^2 + r_0^2)^{-5/2} \quad (26)$$

At the point of closest approach, where $x_m = 0$, this becomes $$\frac{d^2z}{dt^2} = -\frac{shV_m^2}{r_0^3} \quad (26a)$$

Substitution of (24) and (26a) into (22) gives $$\frac{\partial^2}{\partial t^2} \int_0^{r(t)} \mu(s,t) ds \bigg|_{r=r_0} = \frac{V_m^2}{r_0} \left[ \mu(r_0) - \frac{h}{r_0^2} \int_0^{r_0} \frac{\partial u}{\partial z} s\, ds \right]$$

$$= \frac{V_m^2}{r_0} \left[ \mu(r_0) - \frac{h\sec^2\theta_0}{r_0^2} \int_0^h \frac{\partial \mu}{\partial z} z\, dz \right]$$

$$= \frac{V_m^2}{r_0} \left[ \mu(r_0) - \frac{1}{h} \int_0^h \frac{\partial \mu}{\partial z} z\, dz \right] \quad (27)$$

Integration by parts yields $$\int_0^h \frac{\partial \mu}{\partial s} z\, dz = z\mu \bigg|_0^h - \int_0^h \mu\, dz = h\mu(h) - \int_0^h \mu\, dz \quad (28)$$

Since $\mu$ is assumed to vary only with $z$, $\mu(r_0) = \mu(h)$, and (27) becomes $$\frac{\partial^2}{\partial^2 t} \int_0^{r(t)} \mu(s,t) ds \bigg|_{r=r_0} = \frac{V_m^2}{r_0} \left[ \mu(r_0) - \mu(r_0) + \frac{1}{h} \int_0^h \mu\, dz \right]$$

$$= \frac{V_m^2}{r_0 h} \int_0^h \mu\, ds \quad (29)$$

By differentiation of (5), we obtain $$\frac{d(\Delta f)}{dt} = -\frac{1}{\lambda_0} \frac{\partial^2}{\partial t^2} \int_0^r \mu\, ds$$

$$= -\frac{V_m^2}{r_0 \lambda_0 h} \int_0^h ds = -\frac{\mu_{ave} V_m^2}{r_0 \lambda_0} \quad (30)$$

This equation allows determination of the average refractive index in the height interval 0 to $h$ in terms of the rate of change of Doppler shift, satellite velocity, and slant range at closest approach.

As before, we will assume that the satellite radiates on two frequencies, $f$ and $nf$, where n is a sufficiently large integer so that the medium at this higher frequency has a refractive index of essentially unity. Then $$\frac{d}{dt}\Delta(nf) = -\frac{nV_m^2}{r_0 \lambda_0} \quad (31)$$

Combining this with (30) gives $$n\frac{d(\Delta f)}{dt} = \mu_{ave}\frac{d}{dt}\Delta(nf) \quad (32)$$

Let $\mu_{ave} = 1 + \Delta\mu_{ave}$. Solving for $\Delta\mu_{ave}$, we get $$\Delta\mu_{ave} = \frac{\frac{d}{dt}[n\Delta f - \Delta(nf)]}{\frac{d}{dt}\Delta(nf)} \quad (33)$$

Utilizing Equation 16 gives $$N_{ave} = \frac{1}{h}\int_0^h N\, dz \approx \frac{f^2 \frac{d}{dt}[\Delta(nf) - n(\Delta f)]}{40.5 \frac{d}{dt}\Delta(nf)} \quad (34)$$

If $\Delta\mu_{ave}$ is not small compared to 1, the approximation in (16) is not justified and $\Delta\mu$ is not linearly related to N. In this case, $\mu_{ave}$ is not simply related to $N_{ave}$. This can be avoided by choosing $f^2 \gg 81N$; i.e., by making $f$ much larger than the critical frequency of the ionosphere if the F-layer maximum of electron density is included in the range 0 to $h$. For measurements made at night, a frequency of 20 mc. seems to be large enough. However, for many daytime measurements, a frequency as high as 40 mc. is probably justified.

For the sake of illustration, assume $f = 20$ mc., $n = 5$, $V = 25,000$ ft./sec., $$\frac{d}{dt}[\Delta(nf) - n(\Delta f)] = -0.1 \text{ c./sec.}^2$$

$r_0 = 300$ mi. From (31), $$\frac{d}{dt}\Delta(nf) = +40.1 \text{ c./sec.}^2$$

From (33), $\Delta\mu_{ave} = -1/401$.

From (34) $N_{ave} \approx 2.46 \times 10^{10}$ m.$^{-3}$. If we now assume $h = 250$ mi. (402 km.), $$\int_0^h N\, dz \approx 9.9 \times 10^{15} \text{ m.}^{-2}$$

(approximately $10^{12}$ cm.$^{-2}$). Since this is a realistic value, especially for night measurements, it is seen that the rate of change of the beat frequency must be accurately measurable to values less than 0.1 c./sec.$^2$. Achieving this measurement simply and accurately is the principal challenge of the proposed method of determining the average electron density by use of a satellite at its closest approach.

A possible solution is to measure the Doppler shifts at the two frequencies at regular, small intervals and then take differences of successive values of frequency shift. A curve can then be plotted of the rate of change, as given by the difference in frequency divided by the interval length in seconds, and the maximum point on the curve can be read. This method is cumbersome and subject to large errors of measurement. A more desirable method is one in which proper circuits are provided so that the rate information is directly available. The denominator of (33) may be calculated with reasonable accuracy from (31). The numerator in (33) must be measured in a more refined manner. Signals at frequency $f$ and frequency $nf$ may be brought to the same nominal frequency and then heterodyned to some convenient lower frequency, such as 100 kc. Then each signal is split in phase to generate a quadrature component. Finally, the split signals are heterodyned with each other to generate a split-phase signal at the beat frequency $\Delta(nf) - n(\Delta f)$. This may now be used to drive a small instrument-type synchronous motor. The speed of the motor is proportional to the beat frequency. It is now merely necessary to obtain the time derivative of this speed. From the illustration in the preceding paragraph, it may be deduced that the rate of change of speed may be much less than 1 rev./sec.$^2$. The Doppler shift and, hence, the speed is, of course, zero at the instant when a reading is desired. The very low speed and the presence of static friction make this scheme unwieldy and inaccurate, though it illustrates the principle quite clearly.

To avoid such motor operation near zero speed, the two signals may be heterodyned, not with each other, but with another signal of fixed frequency so as to produce a final IF of about 20 c./sec. Each of the two signals is now used to drive a synchronous motor, and each motor is coupled to a D.C. generator. Each generator output is then differentiated and the two resultant outputs are subtracted. This provides a signal which may be recorded. One of the differentiated outputs also yields the denominator of (33). It may be noted that adding a fixed frequency to $n\Delta f$ or $\Delta(nf)$ does not affect the time derivatives. The two generators and differentiators must be carefully balanced to assure correct results. A test for balance is to apply the same voltage to the two motors and observe whether there is any output as the frequency of the applied voltage varies.

Signals corresponding to the numerator and denominator in (33) may be recorded on parallel tracks of recording tape, or a single track may be used and the recorder switched regularly. An elaboration which would produce direct indications of $\Delta\mu_{ave}$ is a self-balancing potentiometer, which yields the ratio shown in the right member of (33).

The proposed scheme can be most readily implemented by employing phase-locked oscillators in the receivers. Experience with such phase-locked oscillators has shown that they provide excellent signal-to-noise ratio in comparison with receivers employing passive narrow-band filters. The phase-lock principle is well-adapted for use with systems involving Doppler shift, since no bandwidth increase is necessary to accommodate the Doppler shift.

The rate-of-change method just described is best adapted for measurement where the ionosphere has essentially horizontal stratification. It is not suitable in auroral regions where strong horizontal gradients of refractive index may exist. However, it should provide at relatively low cost a great improvement in the ability to measure average ionospheric electron densities over large expanses of space and time.

FIGURE 1 illustrates apparatus for measuring the rate of change of $n(\Delta f) - \Delta(nf)$. It is to be noted that a satellite 10 provided with suitable antennas 11 and 12 radiates signals at for example 20 and 100 mc. A pair of ground receivers 13 and 14 tuned respectively to 20 and 100 mc. are connected to receiving antennas 15 and 16. Twenty mc. receiver 13 is connected to a multiplier 17 which multiplies the output of the receiver by five to obtain 100 mc. plus or minus Doppler frequency shift. Mixer 18 receives inputs from a local oscillator 19 which is tuned within 20 cycles of 100 mc. and multiplier 17 to produce a beat frequency of 20 cycles plus Doppler shift. A second mixer 21 receives inputs from the local oscillator 19 and the 100 mc. receiver 14. A pair of synchronous motors 22 and 23 are respectively connected to the outputs of mixers 18 and 21. The motor 22 has an output shaft 24 which is connected to a D.C. generator 26. The output of generator 26 is connected to a differentiator 27. The output shaft 28 of synchro motor 23 is connected to a D.C. generator 29 which applies an output to a differentiator 31. A subtracter 32 receives inputs from differentiators 27 and 31 and supplies an output signal to a recorder 34 which is proportional to the refractive index of the medium.

For example, recorder 34 might record as a function of time the variation in the output of the subtracter 32.

The circuit as shown in FIGURE 1 generates at the subtracter a voltage which is proportional to the numerator of Equation 33. In order to obtain $\Delta\mu_{ave}$, one must measure or record also a signal proportional to the denominator of (33), as previously explained. An output proportional to the denominator can be obtained directly from one of the differentiators. Strictly speaking, this should be the lower channel in FIGURE 1 (differentiator 31). Generator 29 has an output voltage proportional to its speed, and the speed is proportional to $[20+\Delta(nf)]$, i.e., the fixed beat frequency plus the Doppler shift on this channel. Since the derivative of a fixed quantity is zero, differentiator 31 generates a signal proportional to $$\frac{d}{dt}\Delta(nf)$$

As explained previously, the voltages corresponding to the numerator and denominator of (33) may be recorded separately, or a self-balancing potentiometer may be used to compare these voltages and the position of the potentiometer arm may be recorded. Only in the latter case is the recorded signal a direct indication of $\Delta\mu_{ave}$.

It is seen that this invention provides a simple method of determining the refractive index of the upper atmosphere by utilizing earth satellites which are presently or will in the future become available.

Although the invention has been described with respect to preferred embodiments thereof, it is not to be so limited, as changes and modifications may be made therein which are within the full intended scope of the invention as defined by the appended claims.

I claim:

1. A method for measuring refractive index comprising an earth satellite transmitting energy at two frequencies, a pair of receivers situated on the earth and tuned respectively to the frequencies of the energy from the satellite, a multiplier receiving the output of one of the receivers to multiply it by a factor equal to the ratio at the transmitted frequencies, a local oscillator, a pair of mixers receiving inputs from the local oscillator, the first of said pair of mixers receiving the output of the multiplier, the second mixer receiving an input from the second receiver and means for converting the outputs of said first and second mixers into an indication of the refractive index of the ionosphere.

2. A method for measuring refractive index comprising an earth satellite transmitting energy at two frequencies, a pair of receivers situated on the earth and tuned respectively to the frequencies emanating from the satellite, a multiplier receiving the output of one of the receivers to multiply it by a factor equal to the ratio of the transmitted frequencies, a local oscillator, a pair of mixers receiving inputs from the local oscillator, the first of said pair of mixers receiving the output of the multiplier, the second mixer receiving an input from the second receiver, a first synchronous motor receiving the output of the first mixer, a second synchronous motor receiving the output of the second mixer, a first generator driven by the first synchronous motor, a second generator driven by the second synchronous motor, a first differentiator receiving the output of the first generator, a second differentiator receiving the output of the second generator, and a subtractor receiving inputs from the first and second differentiators and producing a voltage proportional to the refractive index.

3. A method for measuring refractive index comprising an earth satellite transmitting energy at two frequencies, a pair of receivers situated on the earth and tuned respectively to the frequencies emanating from the satellite, a multiplier receiving the output of one of the receivers and multiplying it by a factor equal to the ratio of the transmitted frequencies, a local oscillator, a pair of mixers receiving inputs from the local oscillator, the first of said pair of mixers receiving the output of the multiplier, the second mixer receiving an input from the second receiver, a first synchronous motor receiving the output of the first mixer, a second synchronous motor receiving the output of the second mixer, a first direct current generator driven by the first synchronous motor, a second direct current generator driven by the second synchronous motor, a first differentiator receiving the output of the first generator, a second differentiator receiving the output of the second generator, and a subtractor receiving inputs from the first and second differentiators and producing a voltage proportional to the refractive index.

4. A method of measuring refractive index comprising an earth satellite transmitting energy at two frequencies, a pair of receivers situated on the earth and tuned respectively to the frequencies emanating from the satellite, a multiplier receiving the output of one of the receivers to multiply it by a factor equal to the ratio of the transmitted frequencies, a local oscillator, a pair of mixers receiving inputs from the local oscillator, the first of said pair of mixers receiving the output of the multiplier, the second mixer receiving an input from the second receiver, first differentiating means receiving the output of the first mixer, second differentiating means receiving the output of the second mixer, and a subtractor receiving the outputs of the first and second differentiating means and producing an output proportional to the refractive index of the medium between the satellite and the receivers.

References Cited in the file of this patent

UNITED STATES PATENTS 2,900,595     Mengel et al. ------------- Aug. 18, 1959